United States Patent [19]
Tazoe et al.

[11] Patent Number: 6,010,055
[45] Date of Patent: Jan. 4, 2000

[54] ROLLED PLATE JOINING APPARATUS AND CONTINUOUS HOT ROLLING APPARATUS EQUIPPED WITH THE SAME

[75] Inventors: Nobuhiro Tazoe; Toshio Iwanami, both of Yokohama; Masami Oki, Mishima; Kouiti Sakamoto, Ibaragi-ken; Suguhiro Fukushima; Toshihiro Mori, both of Kashima, all of Japan

[73] Assignees: Ishikawajima-Harima Heavy Industries Co., Ltd., Tokyo; Sumitomo Metal Industries Co., Ltd., Osaka, both of Japan

[21] Appl. No.: 08/967,903

[22] Filed: Nov. 12, 1997

[30] Foreign Application Priority Data

| Nov. 13, 1996 | [JP] | Japan | 8-301607 |
| Nov. 13, 1996 | [JP] | Japan | 8-301608 |
| Dec. 6, 1996 | [JP] | Japan | 8-326652 |
| Dec. 6, 1996 | [JP] | Japan | 8-326653 |

[51] Int. Cl.$^7$ .................................................. B23K 37/047
[52] U.S. Cl. ............................................ 228/5.7; 228/171
[58] Field of Search .......................... 228/212, 5.7, 171

[56] References Cited

U.S. PATENT DOCUMENTS

| 3,610,494 | 10/1971 | Minton ...................................... 226/21 |
| 4,003,511 | 1/1977 | Schwestka ................................... 226/3 |
| 5,720,425 | 2/1998 | Tazoe et al. ............................. 228/171 |

FOREIGN PATENT DOCUMENTS

| 0 505 088 | 9/1992 | European Pat. Off. . |
| 0 732 158 A1 | 9/1996 | European Pat. Off. . |
| 0 641 614 A1 | 8/1998 | European Pat. Off. . |
| 62-252603 | 11/1987 | Japan . |
| 63-93408 | 4/1988 | Japan . |
| 5-139 | 1/1993 | Japan . |
| 05 042 392 A1 | 2/1993 | Japan . |
| 7-214104 | 8/1995 | Japan . |
| 8-10809 | 1/1996 | Japan . |
| 2 271 071 | 4/1994 | United Kingdom . |

*Primary Examiner*—Patrick Ryan
*Assistant Examiner*—Jeffrey T. Knapp
*Attorney, Agent, or Firm*—Griffin, Butler, Whisenhunt & Szipl, LLP

[57] ABSTRACT

There is provided a rolled plate joining apparatus equipped with a truck that can travel reversibly in the rolling direction, tailing end pinch rolls that are mounted on the truck and can be moved vertically with the tailing end of a preceding rolled plate pinched horizontally, leading end pinch rolls that are mounted on the truck and can pinch horizontally the leading end of a succeeding rolled plate, machining apparatuses for cutting one surface of the tailing end of the preceding rolled plate and the other surface of the leading end of the succeeding rolled plate, and a pressure welding apparatus for compressing the preceding rolled plate and the succeeding rolled plate with the machined surfaces of the preceding rolled plate and the succeeding rolled plate overlapped to reduce them approximately to the thickness of the rolled plates, including a tailing end centering apparatus placed between the tailing end pinch rolls and the pressure welding apparatus for pressing the opposite width ends of the tailing end of the rolled plate to align the center line of the rolled plate with the center line of the joining apparatus in the rolling direction and a leading end centering apparatus placed between the pressure welding apparatus and the leading end pinch rolls for pressing the opposite width ends of the leading end of the rolled plate to align the center line of the rolled plate with the center line of the joining apparatus in the rolling direction.

2 Claims, 14 Drawing Sheets

ROLLED PLATE JOINING APPARATUS AND CONTINUOUS HOT ROLLING APPARATUS EQUIPPED WITH THE SAME

BACKGROUND OF THE INVENTION

1. Field of the Invention

The present invention relates to a rolled plate joining apparatus for joining the tailing end of a preceding rolled plate and the leading end of a succeeding rolled plate while traveling with the rolled plates in a hot rolling plant and to a continuous hot rolling apparatus equipped with the same.

2. Description of the Related Art

In conventional hot rolling plants (hot strip mills), bar materials rolled by a roughing mill are supplied separately to a finishing mill to obtain strip materials having a desired thickness. By such a means, however, all the rolled plates are not rolled uniformly, such problems 25 defects of leading ends and tailing ends are liable to occur, thereby lowering the yield of the rolled plates 11, and it is hard to increase the rolling speed due to such defects.

To solve the above problems, there are conventionally suggested joining apparatuses for joining the tailing end of a preceding rolled plate and the leading end of a succeeding rolled plate so as to supply the rolled plates to a finishing mill successively (e.g., Japanese Unexamined Patent Publication Nos. 62-252603 and 63-93408 and Japanese Patent Publication No. 5-139).

In the above-described rolled plate joining apparatuses, however, there are such problems as (1) the automation (mechanization) is difficult and the joined sections cannot be rolled uniformly, (2) since it takes long time to weld wide rolled plates, the overall length of the plant is apt to be long, and (3) it is difficult to secure a satisfactory joined strength throughout the width of the rolled plates.

Therefore, the inventors of the present invention thought out a rolled plate joining apparatus capable of joining rolled plates with a satisfactory joined strength throughout the width in a short period of time and filed applications thereon (e.g., Japanese Unexamined Patent Publication No. 8-10809).

FIG. 1 is an example of a rolled plate joining apparatus made by the inventors of the present invention.

This rolled plate joining apparatus is equipped with a truck 3 that travels in the rolling direction, tailing end pinch rolls 4 that are mounted on the truck 3 and can be moved vertically with the tailing end of a preceding rolled plate 1 pinched horizontally, leading end pinch rolls 5 that are mounted on the truck 3 and can pinch horizontally the leading end of a succeeding rolled plate 2, machining apparatuses 6 for cutting the undersurface of the tailing end of the preceding rolled plate 1 and the upper surface of the leading end of the succeeding rolled plate 2, and a pressure welding apparatus 7 for joining the preceding rolled plate 1 and the succeeding rolled plate 2 with the machined surfaces of the preceding rolled plate 1 and the succeeding rolled plate 2 overlapped and reduced approximately to the thickness of the rolled plates 1 and 2.

Further, as is shown in FIGS. 2a and 2b the rolled plate joining apparatus of Japanese Unexamined Patent Publication No. 8-10809 is equipped with the truck 3 that travels with apparatuses mounted thereon, a tailing end clamping apparatus 9 that can be moved vertically between a pressure welding level H and a rolling level L by an elevating apparatus 8 with the tailing end of the preceding rolled plate pinched horizontally, a leading end clamping apparatus 10 for pinching and holding the leading end of the succeeding rolled plate 2 at a pressure welding level L, a machining apparatus 11 for cutting simultaneously the undersurface of the tailing end of the preceding rolled plate 1 and the upper surface of the leading end of the succeeding rolled plate 2, a reduction keeping apparatus 12a for keeping the surfaces to be cut in a reducing atmosphere, and a pressure-welding apparatus 12b for pressure-welding the overlapped sections.

The machining apparatus 11 is composed of a conical cutter 13 that is rotated about an axis X slanted to the level and a traverse moving apparatus 14 for moving horizontally the conical cutter 13 throughout the width of the rolled plates from a position that is out of the position of the rolled plates. The conical cutter 13 has a pair of truncated conical surfaces 13a, 13b whose tops are directed outward and the uppermost part and the lowermost part of the truncated conical surfaces are generally horizontal, so that the uppermost part and the lowermost part of the truncated conical surfaces can touch the undersurface of the tailing end and the upper surface of the leading end simultaneously respectively. In passing, cutter tips 13c are embedded in the truncated conical surfaces 13a, 13b. Further, 15 indicates a traverse moving table of the traversing apparatus 14.

Further, Japanese Unexamined Patent Publication No. 7-214104 describes a hot rolling plant wherein joining machine is used. As is shown in FIG. 3, of the present application this hot rolling plant is provided with a sizing press 16b on the exit side of a heating furnace 16a, and the leading end and the tailing end of a rolled plate 1 rolled by a roughing mill 16c provided on the exit side thereof is sheared by a crop shear 16d. The tailing end of the sheared preceding sheet bar and the leading end of the sheared succeeding sheet bar are joined by a fuse-joining apparatus 17 and are subjected to finish rolling by a group of finishing mills 16e and the joined sheet bars are wound by a winding machine 16f.

(1) In the rolled plate joining apparatus shown in FIG. 1 or 2, of the present application it is required to align the center lines of the preceding rolled plate 1 and the succeeding rolled plate 2. FIG. 4 shows a state wherein the center line of one rolled plate is not aligned with the center line of other rolled plate to be joined and if they are joined in this state, plate breaking or camber due to the defective joining will occur. FIG. 5 of this application shows misalignment of the center lines in the joined sections of rolled plates having different widths. If the center line of a preceding rolled plate and the center line of a succeeding rolled plate are misaligned in this way, problems arise that will cause serious troubles with succeeding finishing rolling or the like.

(2) Further, the life of the conical cutter 13 of the rolled plate joining apparatus shown in FIG. 2 of the present application is extremely short due to such factors as [1] the conical cutter 13 is exposed to a high-temperature atmosphere by the reduction keeping apparatus, [2] the conical cutter 13 is rotated at a high speed by the driving apparatus, [3] the conical cutter 13 is moved horizontally in the width direction of the rolled plates by the traverse moving apparatus, and [4] use of the cutter tips for the conical cutter makes the heat capacity small. In addition, it is difficult to provide a cooling mechanism, because, for example, [1] the driving apparatus is attached to the extremity of the shaft of the conical cutter and [2] a key groove into which a key is fitted is formed in the inner circumferential surface of the conical cutter.

(3) Furthermore, in the rolled plate joining apparatus, the cutting of the surfaces to be joined is required to be done in a short period of time. Because if the cutting time becomes long, the joining time becomes long which makes the traveling distance of the joining apparatus long and therefore the rolling line becomes long. Furthermore, since the surfaces to be cut during the cutting are covered with reducing flames to prevent them from being oxidized, the surfaces to be cut are at a high temperature and therefore a lubricant cannot be used during the cutting. As a result, the cutter tips are abraded intensely, the life thereof is short, and therefore the cutter has to be replaced frequently. Further, if the cutter is damaged during the cutting, the replacement takes a longer time, and during that time, the joining operation and the rolling operation have to be stopped. The joining is carried out with a certain interval between the joining operations, but the heat capacity of the cutter is large, the cutter tips are not cooled in many cases until the next joining operation, and therefore the temperature of the cutter tips during the cutting is increased to make the life short.

(4) Furthermore, in the hot rolling plant shown in FIG. 3, of the present application since the rolled plates after the rough rolling are not wound, the rolling line becomes long. Then, in this plant, the temperature of the rolled plates supplied to the finish rolling machine is lowered and the finish rolling cannot be carried out suitably in many cases. Furthermore, in many cases, the joined sections bulge in the plate width direction, and this bulge is expanded by rolling in the succeeding step. FIG. 6 herein shows the shape of the bulge at the joined sections. The plate width at the joined position of the rolled plate 1 has a bulge 1a. In FIG. 7 of this application, the rolled plate 1 is tapered at the opposite ends to form edge drops 1b. Edge drops 1b cannot secure the precision of the plate thickness at the opposite ends and therefore are trimmed, resulting in a decrease in the yield. The plant shown in FIG. 3 does not have a correcting apparatus for correcting such joined sections or a defective thickness at the opposite ends due to rolling. Furthermore, since there is no shear before the winding machine, it is required to sever the rolled plates for every quantity of the rolled plates that can be wound by the winding machine and the ability capable of operating continuously by the joining machine is not used. In passing, Japanese Unexamined Patent Publication No. 7-24503 discloses a post-forming machine for removing defective parts due to joining positioned on the exit side of a joining machine, but this post-forming machine cannot correct edge drops resulting from finish rolling.

SUMMARY OF THE INVENTION

The present invention has been thought out so as to solve the above-described various problems. That is, a first object of the present invention is to provide a rolled plate joining apparatus that has a sensing apparatus for aligning the center lines of a preceding rolled plate and a succeeding rolled plate.

Further, a second object of the present invention is to provide a rolled plate joining apparatus that has cutter cooling apparatuses capable of efficiently cooling conical cutters, and particularly cutter tips.

Still, a third object of the present invention is to provide a rolled plate joining apparatus that allows a waiting cutter to be cooled rapidly, allows an abrasion preventive agent to be applied to a waiting cutter, and allows a cutter be replaced rapidly.

Further, a fourth object of the present invention is to provide a continuous hot rolling apparatus that shortens a rolling line, improves the productivity of strip materials by continuous rolling and the preciseness of the width and thickness of plates, and increases the ability of adjusting the width of slabs to decrease the types of the widths of slabs on the side of a continuous casting machine to which the slabs are supplied to improve the productivity.

To attain the first object, according to the present invention, there is provided a rolled plate joining apparatus equipped with a truck that can travel reversibly in the rolling direction, tailing end pinch rolls that are mounted on said truck and can be moved vertically with the tailing end of a preceding rolled plate pinched horizontally, leading end pinch rolls that are mounted on said truck and can pinch horizontally the leading end of a succeeding rolled plate, machining apparatuses for cutting one surface of the tailing end of the preceding rolled plate and the other surface of the leading end of the succeeding rolled plate, and a pressure welding apparatus for compressing the preceding rolled plate and the succeeding rolled plate with the machined surfaces overlapped to reduce them approximately to the thickness of the rolled plates, comprising a tailing end centering apparatus placed between said tailing end pinch rolls and said pressure welding apparatus for pressing the opposite width ends of the tailing end of the rolled plate to align the center line of said rolled plate with the center line of said joining apparatus in the rolling direction and a leading end centering apparatus placed between said pressure welding apparatus and said leading end pinch rolls for pressing the opposite width ends of the leading end of the rolled plate to align the center line of said rolled plate with the center line of said joining apparatus in the rolling direction.

By the above constitution, the tailing end centering apparatus aligns the center line of a preceding rolled plate with the center line of the joining apparatus in the rolling direction at the tailing end of the preceding rolled plate. Herein the term "the center line of the joining apparatus in the rolling direction" means the line along which the center line of the rolled plate is to be passed and is generally the center line of the joining apparatus in the rolling direction but also includes lines parallel to it. Further, the leading end centering apparatus aligns the center line of a succeeding rolled plate with the center line of the joining apparatus in the rolling direction at the leading end of the succeeding rolled plate. Thus, the pressure welding can be made with the center line of a preceding rolled plate aligned with the center line of a succeeding rolled plate.

In accordance with a preferred embodiment of the present invention, each of said tailing end centering apparatus and said leading end centering apparatus comprises guide plates provided along the opposite width ends of the rolled plate, a lower rack plate having a rack on the upper surface in the plate width direction and fixed to one of the guide plates, an upper rack plate having a rack on one surface in the plate width direction and fixed to the other of the guide plates, a pinion arranged between said lower rack plate and said upper rack plate and meshed with said racks of said rack plates, and a rack plate driving apparatus for extending or retracting said lower rack plate and said upper rack plate in the plate width direction.

In accordance with the above constitution, when the lower rack plate and the upper rack plate are retracted or extended in the plate width direction by the rack plate driving apparatus, the guide plates fixed to the rack plates are moved horizontally by the same distance in the width direction of the rolled plates by the action of the racks and the pinion. In the centering apparatuses, by setting the left and right guide plates to be at the same distance from the center line of the joining apparatus in the rolling direction, the left and right guide plates can be moved by the same distance from the center line of the joining apparatus in the rolling direction at all the time and therefore the center line of the rolled plate can be aligned with the center line of the joining apparatus in the rolling direction.

Further, preferably, said tailing end centering apparatus has elevating apparatuses and carries out a centering operation for aligning the center line of the rolled plate that is kept raised or lowered by said tailing end pinch rolls with the center line of the joining apparatus in the rolling direction.

According this constitution, the tailing end of the preceding rolled plate is raised higher than the leading end of the succeeding rolled plate by the tailing end pinch rollers and after one surface to be joined is machined and is lowered, one surface is joined to the other surface of the leading end of the succeeding rolled plate. The centering operation of the preceding rolled plate is carried out with the unmachined tailing end of the preceding rolled plate raised and after the center line of the rolled plate is aligned with the center line of the joining apparatus in the rolling direction, the machining is carried out and then the tailing end of the preceding rolled plate is lowered to join one surface of the tailing end of the preceding rolled plate to the other surface of the leading end of the succeeding rolled plate. At that time, the centering can be made again to align positively the center lines of the rolled plates. Since the tailing end centering apparatus has an elevating apparatus, the centering can be made twice in this manner.

To attain the second object, according to the present invention, there is provided a cutter cooling apparatus of a rolled plate joining apparatus for joining rolled plates after cutting the rolled plates by moving, horizontally in the width direction of the rolled plates, a cutter that is fitted to the extremity of a slant shaft and is rotated, wherein said cutter has a plurality of cutter tips (e.g., made of a cemented carbide produced by sintering WC (tungsten carbide), a major component, together with Co (cobalt)) on the surfaces and is abutted on and fixed to a flange section provided to said shaft by putting from the extremity of the shaft, a supply ring is fitted to form an annular space behind said flange section between it and the outer circumferential surface of said shaft, said shaft is provided with a supply passage passing through the inside of said shaft from said annular space to communicate with a contact surface of said flange section in contact with said cutter, said cutter is provided with cooling passages in communication with said supply passage and extending to said cutter tips, and a coolant is supplied from the outside into said annular space to cool said cutter tips from the inner surfaces.

In the above-described cutter cooling apparatus of a rolled plate joining apparatus, the cutter tips are brought in contact with a coolant (a cooling non-oxidizing liquid or cooling inert gas) not from the outside of the high-temperature atmosphere to which the cutter is exposed but from the inside. That is, the coolant can reach the inner surfaces (the surfaces where the connection is made) of the cutter tips through the supply passage and the cooling passages from the annular space of the supply ring. The coolant reached the inner surfaces of the cutter tips leaks outside from their gaps to form streams. Therefore, a fresh coolant can be supplied to the cutter tips all the time and therefore the cooling can be carried out efficiently.

Further, according to the present invention, there is provided a cutter. cooling apparatus of a rolled plate joining apparatus for joining rolled plates after cutting the rolled plates by moving, horizontally in the width direction of the rolled plates, a cutter that is fitted to the extremity of a slant shaft and is rotated, wherein a cover having opening sections at positions corresponding to the position of said cutter is provided on one or each of the opposite sides of said shaft, a cooling pipe for supplying a coolant is supported outside of said cover, cooling nozzles directed to said opening sections from said cooling pipe are provided, and a coolant is jetted from said cooling nozzles to said cutter to cool said cutter.

The above-described present cutter cooling apparatus of a rolled plate joining apparatus jets a coolant (a cooling non-oxidizing liquid or cooling inert gas) from the outside of the cutter to carry out the cooling. That is, a cover that supports a cooling pipe and cooling nozzles and screens out a high-temperature atmosphere is provided and the coolant is jetted from the openings thereof to the surfaces of the cutter tips. Therefore, while the temperature of the coolant is kept low, it can be supplied to the cutter to effect the cooling efficiently.

Furthermore, according to the present invention, there is provided a cutter cooling apparatus of a rolled plate joining apparatus for joining rolled plates after cutting the rolled plates by moving, horizontally in the width direction of the rolled plates, a cutter that is fitted to the extremity of a slant shaft and is rotated, wherein said cutter has a plurality of cutter tips on the surfaces and is abutted on and fixed to a flange section provided to said shaft by putting from the extremity of the shaft, a supply ring is fitted to form an annular space behind said flange section between it and the outer circumferential surface of the shaft, said shaft is provided with a supply passage passing from said annular space through the inside of said shaft to communicate with a contact surface of said flange section in contact with said cutter, said cutter is provided with cooling passages in communication with said supply passage and extending to said cutter tips, a cover having opening sections at positions corresponding to the position of said cutter is provided on one or each of the opposite sides of said shaft, a cooling pipe for supplying a coolant is supported outside of said cover, a supply pipe for supplying a coolant from said cooling pipe into said annular space is connected to said supply ring, cooling nozzles directed to said opening sections from said cooling pipe are provided, and a coolant from said cooling passage is brought in contact with the inner surfaces of said cutter tips and is jetted from said cooling nozzles to said cutter tips to cool said cutter tips from the surfaces and the undersurfaces.

The above-described present cutter cooling apparatus of a rolled plate joining apparatus cools cutter tips from the surfaces and the undersurfaces thereof. That is, internal cooling by supplying a coolant (a cooling non-oxidizing liquid or cooling inert gas) to the inner surfaces of cutter tips through the supply ring (annular space), the supply passage, and the cooling passages through a cooling pipe and external cooling by jetting the coolant supplied from the cooling pipe to the surfaces of the cutter tips from cooling nozzles can be carried out simultaneously. Accordingly, the cutter (particularly the cutter tips) can be efficiently cooled.

To attain the third object, according to the present invention, there is provided a rolled plate joining apparatus for joining rolled plates by cutting one surface of the tailing end of a preceding rolled plate and the other surface of the leading end of a succeeding rolled plate while traveling in the width direction and by overlapping the resulting cut surfaces to be joined, comprising machining apparatuses each having a cutter for cutting one surface of the tailing end and the other surface of the leading end, a traversing apparatus for running said machining apparatuses in the plate width direction to move said machining apparatuses to waiting positions outside of the plate width, and cutter cooling apparatuses provided in said waiting positions for cooling said cutters.

By this constitution, the joining of rolled plates is carried out with an interval between the joining operations, after the cutting of the surfaces to be joined, the machining apparatus waits in the waiting position that is outside of the plate width, during that waiting the cutter is cooled by the cutter cooling apparatus, so that the increase in temperature during the cutting can be lowered and the life of the cutter tips can be prolonged.

Further, according to the present invention, there is provided a rolled plate joining apparatus for joining rolled plates by cutting one surface of the tailing end of a preceding rolled plate and the other surface of the leading end of a succeeding rolled plate while traveling in the width direction and by overlapping the resulting cut surfaces to be joined, comprising machining apparatuses each having a cutter for cutting one surface of the tailing end and the other surface of the leading end, a traversing apparatus for running said machining apparatuses in the plate width direction to move said machining apparatuses to waiting positions outside of the plate width, and applying apparatuses provided in said waiting positions for applying an abrasion preventive agent to said cutters.

By this constitution, the joining of rolled plates is carried out with an interval between the joining operations, after the cutting of the surfaces to be joined, the machining apparatus waits in the waiting position that is outside of the plate width, during that waiting an abrasion preventive agent can be applied to the cutter tips to reduce the abrasion of the cutter tips.

Further, according to the present invention, there is provided a rolled plate joining apparatus for joining rolled plates by cutting one surface of the tailing end of a preceding rolled plate and the other surface of the leading end of a succeeding rolled plate while traveling in the width direction and by overlapping the resulting cut surfaces to be joined, comprising machining apparatuses each having a cutter for cutting one surface of the tailing end and the other surface of the leading end, a traversing apparatus for running said machining apparatuses in the plate width direction to move said machining apparatuses to waiting positions outside of the plate width, and replacing apparatuses provided in said waiting positions for replacing said cutters, wherein at least two machining apparatuses wait in said waiting positions.

By this constitution, if the cutter is damaged during the cutting of the surfaced to be joined, the particular machining apparatus is moved to the waiting position and is replaced with the machining apparatus waiting in the waiting position, so that the joining operation can be resumed quickly. Further, at the waiting position, the cutter whose cutter tips have been damaged can be replaced.

To attain the fourth object, according to the present invention, there is provided a continuous hot rolling apparatus, comprising a sizing press for forcing down a rolled plate in the width direction supplied from a heating furnace to press the rolled plate to have a prescribed width, roughing mills for rolling said pressed rolled plate, a winding/unwinding machine for winding and unwinding the rolled plate rolled by said roughing mills, a crop shear for shearing the leading end and the tailing end of the rolled plate that has been unwound, an running joining machine that can travel at the conveying speed of the unwound rolled plate for joining the tailing end of the preceding rolled plate and the leading end of the succeeding rolled plate that have been sheared by said crop shear, a finishing mill for carrying out finish rolling of the joined rolled plates, a winding machine for winding the rolled plate that has been subjected to finish rolling, and a cutting machine positioned on the entrance side of said winding machine for cutting the rolled plate in accordance with the wound length.

By the above constitution, since the sizing press is forced down in the plate width by a press, the ability of adjusting the plate width is large, and therefore if the number of the types of the widths of the slabs is small, slabs having various widths can be made. Thus, by making the widths of slabs less varied, the operation of varying the width of the slab on the side of the continuous casting apparatus is made less often and therefore the productivity is improved. By providing the winding/unwinding machine after the roughing mills, the rough rolling line is shortened, and by winding the rolled plates into a coil, the effect of keeping temperature prevents the rolled plates to be supplied to the finishing mill from being cooled. The leading end and the tailing end of the rolled plates are severed by the crop shear suitably for joining and are then joined by the joining machine, and the strip after the finish rolling is suitably sheared by the shear on its exit side and is wound by the winding machines successively, so that the continuous rolling becomes possible to improve the productivity.

According to a preferred embodiment of the present invention, the above finishing mill comprises a plurality of finishing mills and an edge forming machine having vertical rolls provided on the opposite sides of the rolled plate is placed at at least one position out of positions on the entrance sides of said finishing mills.

By this constitution, a bulge at joined sections joined by the joining machine and edge drops are formed by the edge forming machine and therefore the precision of the plate width and the precision of the plate thickness can be improved. Further, since the edge forming machine carries out the forming by vertical rolls, members that are not used as proper products as in the case of a forming machine for cutting defective parts are not produced, and therefore the yield of the material is improved.

Further, the above running joining machine is preferably a reducing flame pressure welding type running joining machine wherein the tailing end of a preceding rolled plate and the leading end of a succeeding rolled plate are overlapped and the surfaces to be joined are pressure-welded with them covered with reducing flames.

By this constitution, since the surfaces to be joined are covered with reducing flames, the surfaces to be joined can be prevented from being oxidized and a good joined connection can be obtained. Since the joining is carried out by pressure welding, the joining can be carried out in a short period of time and the length along which the joining machine travels together with the rolled plates during the joining can be shortened. As a result, the rolling line is also shortened.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
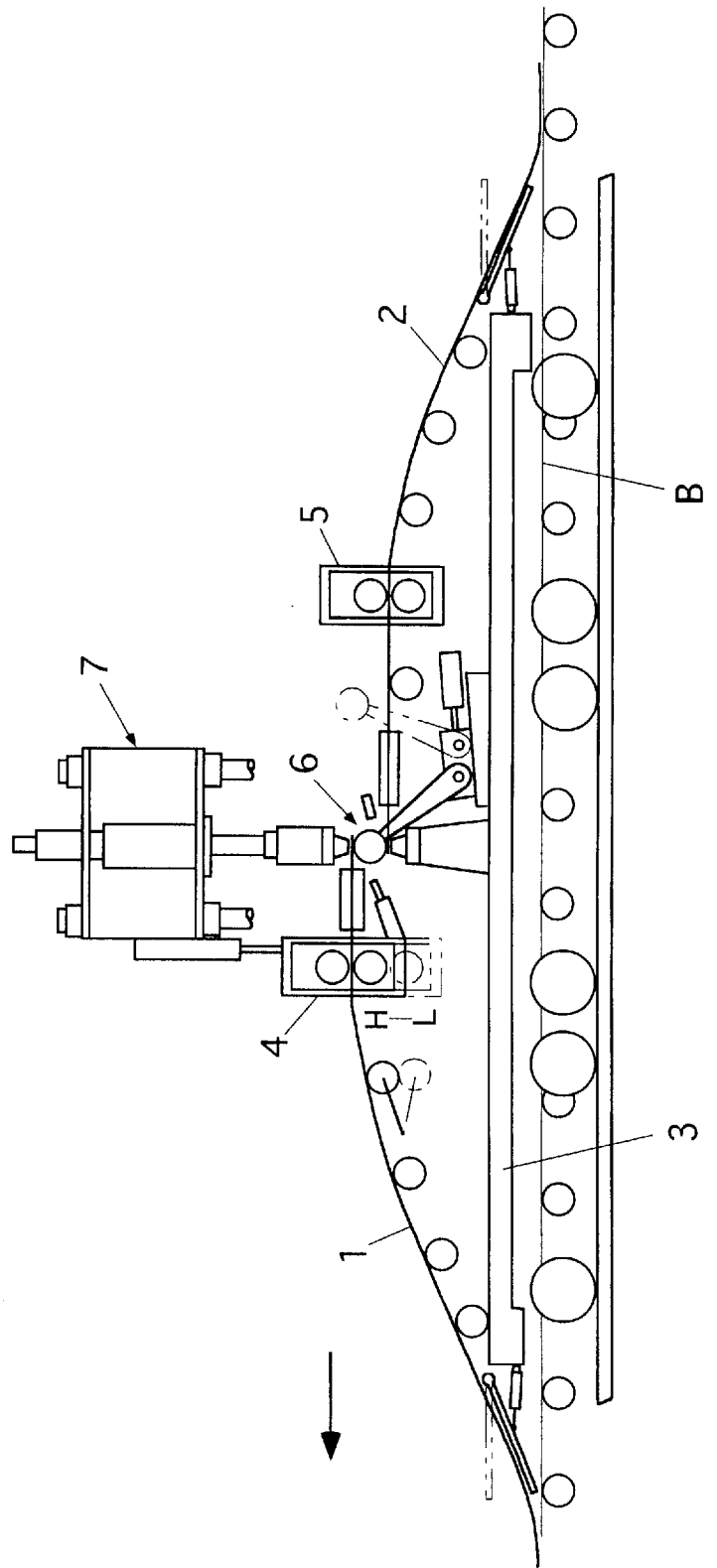
FIG. 1 is a view showing the constitution of a conventional pressure welding joining apparatus.

Hereinbelow, embodiments of the present invention are described by reference to the drawings. In the drawings, like numerals designate like parts.

Figure 8:
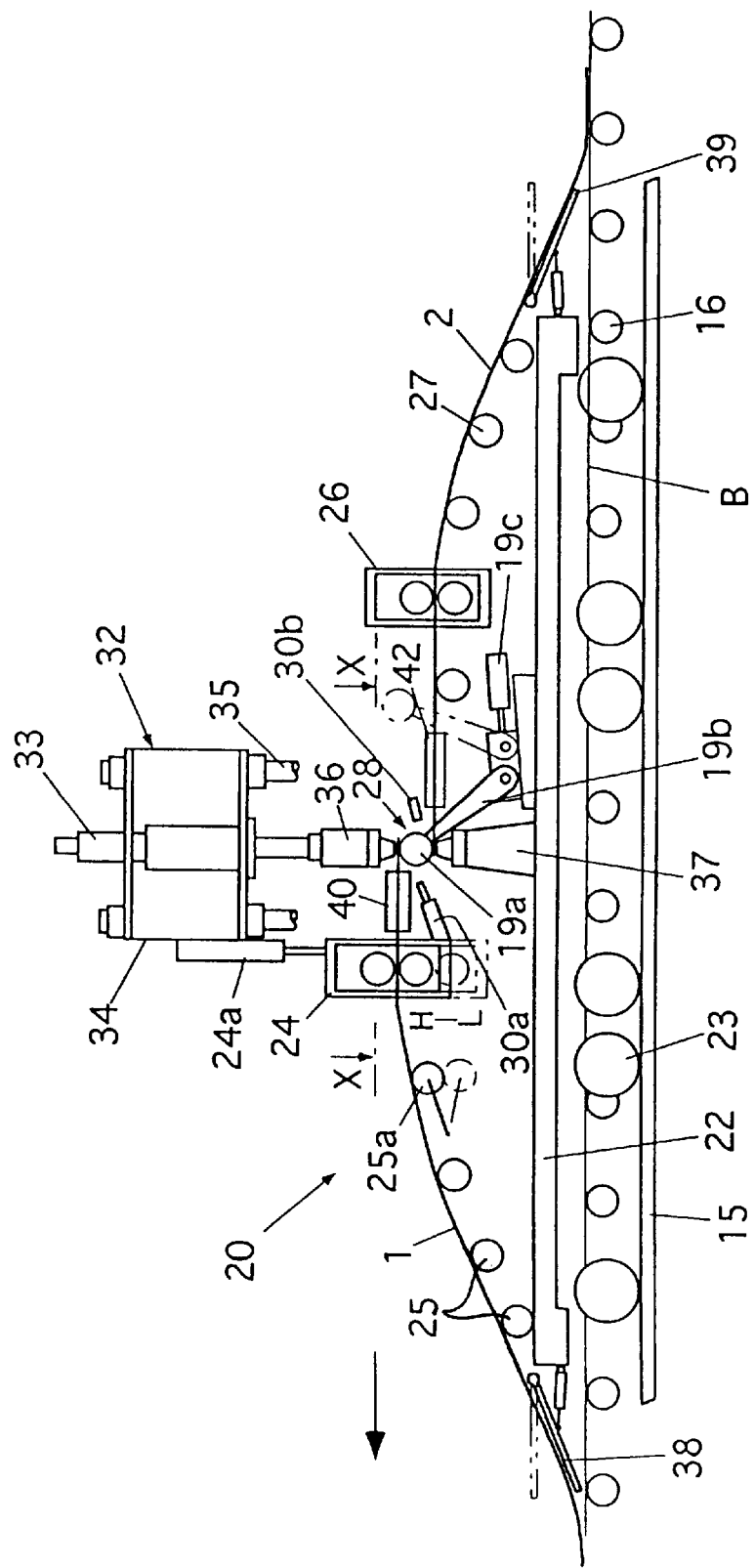
FIG. 8 is a view showing the whole constitution of the rolled plate joining apparatus according to the present invention.

FIG. 8 is a side view showing a first embodiment of the present invention. In this figure, the rolled plate joining apparatus 20 of the present invention comprises a truck 22 that travels in the rolling direction shown by an arrow, tailing end pinch rolls 24 that are mounted on the truck 22 and can be moved vertically with the tailing end of a preceding rolled plate 1 pinched horizontally, leading end pinch rolls 26 that are mounted on the truck 22 and can pinch horizontally the leading end of a succeeding rolled plate 2, machining apparatuses 28 for cutting the undersurface of the tailing end of the preceding rolled plate 1 and the upper surface of the leading end of the succeeding rolled plate 2, reducing flame burners 30a and 30b for keeping the surfaces to be machined in a reducing atmosphere, and a pressure welding apparatus 32 for joining the preceding rolled plate 1 and the succeeding rolled plate 2 with the machined surfaces of the preceding rolled plate 1 and the succeeding rolled plate 2 overlapped and reduced approximately to the thickness of the rolled plates 1 and 2.

The above constitution is the same as that of the conventional one shown in FIG. 1. The rolled plate joining apparatus 20 of the present invention is further provided with a tailing end centering apparatus 40 between the tailing end pinch rolls 24 and the pressure welding apparatus 32 and a leading end centering apparatus 42 between the pressure welding apparatus 32 and the leading end pinch rolls 26.

An elevating cylinder 24a attached to the side surface of a frame 34 of the pressure welding apparatus 32 raises or lowers the tailing end pinch rolls 24 between a machining level H where the undersurface of the tailing end of the preceding rolled plate 1 is brought in contact with the upper surface of the below-described cutter 19a and a pressure welding level L where the tailing end of the preceding rolled plate 1 is kept approximately at the same level as that of the leading end of the succeeding rolled plate 2. The tailing end pinch rolls 24 comprises an upper and lower rolls and the upper roll is raised or lowered by a driving apparatus (not shown). When the upper roll is lowered, the tailing end of the preceding rolled plate 1 is pinched horizontally, while when the upper roll is raised, the lower roll acts as a guide roll of the rolled plate. Thus, while the preceding rolled plate 1 is held at the machining level H by the elevating cylinder 24a with the tailing end of the preceding rolled plate 1 supported horizontally by the tailing end pinch rolls 24, the undersurface of the tailing end of the preceding rolled plate 1 and the upper surface of the leading end of the succeeding rolled plate 2 can be cut by the cutter 19a, then the tailing end pinch rolls 24 are lowered to place the surfaces of the preceding rolled plate 1 and the succeeding rolled plate 2 to be machined one over the other with the tailing end of the preceding rolled plate 1 supported horizontally and they can be pressed and joined by the pressure welding apparatus 32.

The leading end pinch roll 26 comprises an upper roll and a lower roll and the upper roll is moved vertically by a driving apparatus (not shown). The upper roll is lowered to pinch the leading end of the succeeding rolled plate 2 horizontally and when the upper roll is raised, the lower roll acts as a guide roll of the rolled plate.

Guide rollers 25 are arranged stepwise in front of the tailing end pinch rolls 24, so that the rolled plate 1 assumes a posture of a gentle curve. A displacement roller 25a is moved vertically in conformity with the elevation of the tailing end pinch rolls 24 and when the tailing end pinch rolls 24 are at the pressure welding level L, the displacement roller 25a is displaced so that the rolled plate 1 may be placed horizontally. Before and after the leading end pinch rolls 26 are also arranged guide rollers 27, so that the rolled plate 2 assumes a posture of a gentle curve.

The machining apparatus 28 comprises a cylindrical cutter 19a that is rotated around the axis extending in the direction of the width of the rolled plates 1, 2, an arm 19b for swinging slantly the cutter 19a, and a reciprocating machine (hydraulic cylinder) 19c for moving back and forth the cutter 19a slantly to the rolling direction. The cutter 19a is attached to the extremity of the arm 19b and performs rotating cutting by a rotating driving apparatus (not shown). The cutter 19a cuts the undersurface of the tailing end of the preceding rolled plate 1 and the upper surface of the leading end of the succeeding rolled plate 2 at the machining position of the arm 19b shown in solid line in FIG. 8 by the action of the arm 19b and the reciprocating apparatus 19c and after the machining, the arm 19b is retracted to the position shown in phantom line.

The reducing flame burners 30a, 30b burn a combustible gas, such as coke oven gas, LPG, and LNG, with oxygen in an amount less than the amount to cause complete combustion thereby forming reducing flames and blow the flames to the surfaces to be machined to prevent the surfaces from being oxidized. The reducing flame burner 30a is attached to the tailing end pinch rolls 24 and the reducing flame burner 30b is attached to the truck 22 through a support (not shown). The reducing flame burners 30a, 30b blow reducing gas toward the surfaces to be machined of the undersurface of the tailing end of the preceding rolled plate 1 and the upper surface of the leading end of the succeeding rolled plate 2 to keep them in a reducing atmosphere to prevent the cut surfaces from being oxidized and also to prevent the temperature of the cut surfaces from being lowered.

In the pressure welding apparatus 32, several (in this case three) hydraulic cylinders 33 are used. The hydraulic cylinders 33 are supported by the frame 34 and the frame 34 is supported by props 35. The lower parts of the props 35 are fixed to the truck 22. The rod extremities of the hydraulic cylinders 33 are fixed to an upper mold apparatus 36 and below the upper mold apparatus 36, a lower mold apparatus 37 for bearing the compression load from the hydraulic cylinders 33 is fixed to the truck 22. The upper mold apparatus 36 is driven down by the hydraulic cylinders 33 to press the upper surface of the preceding rolled plate 1 and the undersurface of the succeeding rolled plate 2 to forcibly join the rolled plates 1, 2 to approximately the thickness of the rolled plates 1, 2.

The truck 22 has a plurality of wheels 23 and can travel on rails 15 extending in the rolling direction. B indicates the rolling level of the rolling apparatus and the rolled plate 1 or 2 is supported on a plurality of rollers 16 and is moved in the rolling direction. The rails 15 are arranged outside of the rollers 16 and allow the truck 22 to travel in a position higher than the rails 15 with the pressure welding level L being higher than the rolling level B. Slanted guides 38, 39 are provided that can be swung up and down to guide the rolled plate 1 from the rolling level B of the rolling apparatus to the leading end pinch rolls 26 and from the tailing end pinch rolls 24 to the rolling level B and are swung by hydraulic cylinders, respectively. By positioning the slanted guides 38, 39 in the positions shown in phantom line, an existing rolling apparatus can be operated.

Figure 9:
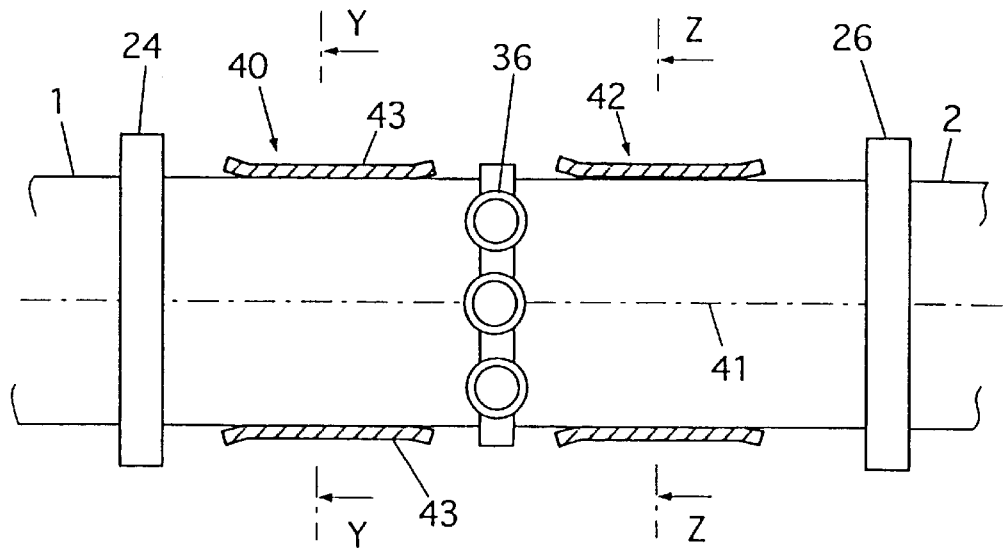
FIG. 9 is a view showing the arrangement of guide plates taken in the direction of the arrows X and X of FIG. 8.

FIG. 9 is a view taken in the direction of the arrows X and X of FIG. 8, showing the arrangement of guide plates for aligning the center lines of the rolled plates 1, 2. The guide plates 43 are parallel with the center line 41 in the rolling direction of the joining apparatus 20 and the opposed guide plates 43 can be moved in the direction of the width of the rolled plates 1, 2 by equal distances from the center line 41.

Figure 10:
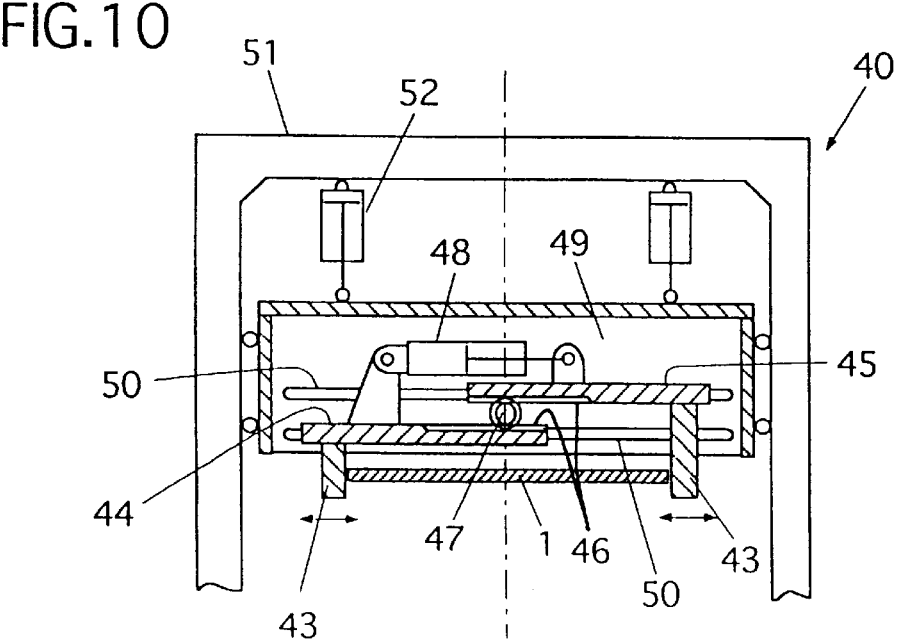
FIG. 10 is a view showing the constitution of a tailing end centering apparatus taken in the directions of the arrows Y and Y of FIG. 9.

FIG. 10 shows the constitution of the tailing end centering apparatus 40 shown in the direction of the arrows Y and Y of FIG. 9. A pinion 47 is positioned between a lower rack plate 44 having a rack 46 on its upper surface and an upper rack plate 45 having a rack 46 on its undersurface and is meshed with the racks 46 of the rack plates 44, 45. The guide plates 43 are fixed to the undersurfaces of the rack plates 44, 45 in the rolling direction and the distance between the guide plates 43 is of the order of the width of a standard rolled plate. The lower rack plate 44 and the upper rack plate 45 can be retracted or extended in the direction of the width of the rolled plates 1, 2 by a rack plate driving apparatus 48. Although the shown rack plate driving apparatus 48 uses a hydraulic cylinder, it may use an apparatus for rotating the pinion 47.

The forward end and the rearward end of the upper and lower rack plates 44, 45 in the rolling direction are provided with end plates 49 that are integrally joined. The end plates 49 are provided with horizontal guide grooves 50 for guiding the movement of the upper and lower rack plates 44, 45 in the plate width direction. A support frame 51 in the shape of a gate attached to a truck 22 is provided outside of the end plates 49 and restricts the movement of the end plates 49 only to the vertical movement. The end plates 49 are moved vertically by elevating cylinders 52 attached to the support frame 51. The tailing end centering apparatus 40 is set in such that the guide plates 43 have equal distances from the center line 41 of the joining apparatus 20 in the rolling direction. By retracting or extending the upper and lower rack plates 44, 45 in the direction of the width of the rolled plate by the rack plate driving apparatus 48, the center line of the preceding rolled plate 1 can be aligned with the center line of the joining apparatus 20 in the rolling direction. Further, by operating the elevating cylinders 52, the guide plates 43 can be moved vertically.

Figure 11:
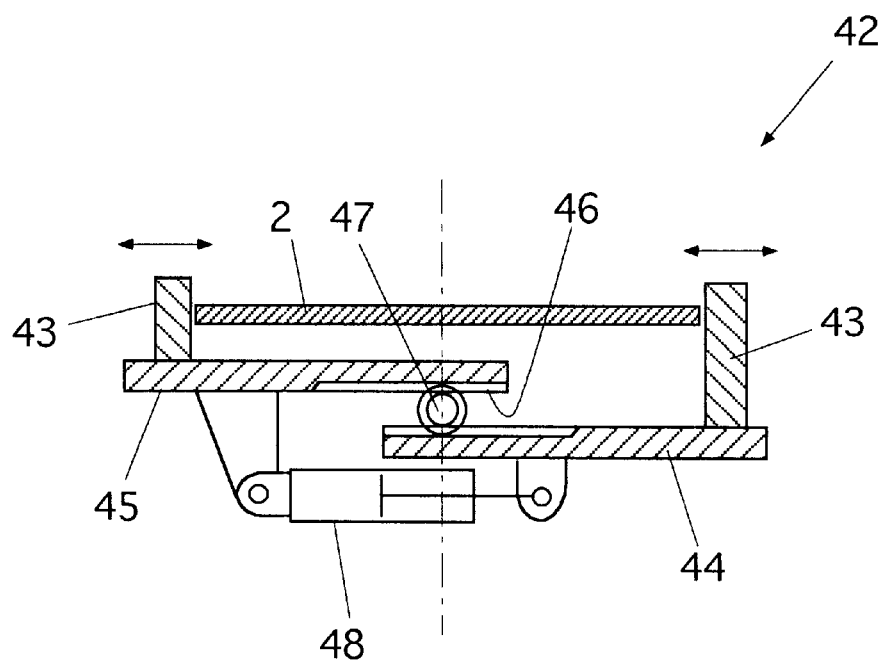
FIG. 11 is a view showing the constitution of a leading end centering apparatus taken in the directions of the arrows Z and Z of FIG. 9.

FIG. 11 is a view taken in the direction of the arrows Z and Z of FIG. 9, showing the constitution of the leading end centering apparatus 42. While the tailing end centering apparatus 40 is provided on the upper side of the rolled plate 1, the leading end centering apparatus 42 is provided on the lower side of the rolled plate 2. However, the basic constitution of the latter for centering is the same as the former. That is, a pinion 47 is arranged between a lower rack plate 44 having a rack 46 on its upper surface and an upper rack plate 45 having a rack 46 on its undersurface and is meshed with the racks 46 of the rack plates 44, 45. The guide plates 43 are fixed to the upper surfaces of the rack plates 44, 45 in the rolling direction and the distance between the guide plates 43 is of the order of the width of the standard rolled plate. The lower rack plate 44 and the upper rack plate 45 can be retracted or extended in the direction of the width of the rolled plates 1, 2 by a rack plate driving apparatus 48. Although the shown rack plate driving apparatus 48 uses a hydraulic cylinder, it may use an apparatus for rotating the pinion 47. Further, the leading end centering apparatus 42 is set in such that the guide plates 43 have equal distances from the center line 41 of the joining apparatus 20 in the rolling direction. By retracting or extending the upper and lower rack plates 44, 45 in the direction of the width of the rolled plate by the rack plate driving apparatus 48, the center line of the succeeding rolled plate 2 can be aligned with the center line of the joining apparatus 20 in the rolling direction. Thus, by aligning the center line of the preceding rolled plate 1 with the center line 41 of the joining apparatus 20 in the rolling direction and aligning the center line of the succeeding rolled plate 2 with the center line 41 of the joining apparatus 20, the center lines of the preceding rolled plate 1 and the succeeding rolled plate 2 can be aligned with each other.

As is apparent from the above description, by providing the tailing end centering apparatus and the leading end centering apparatus, the present invention allows the center lines of the preceding rolled plate and the succeeding rolled plate to be aligned with each other thereby making precise joining possible and thus by securing the straightness of the rolled plates positively, the occurrence of a camber or a meander at the time of the finish rolling can be prevented. Thereby the time of stoppage of the line can be reduced to improve the productivity.

Figure 2A:
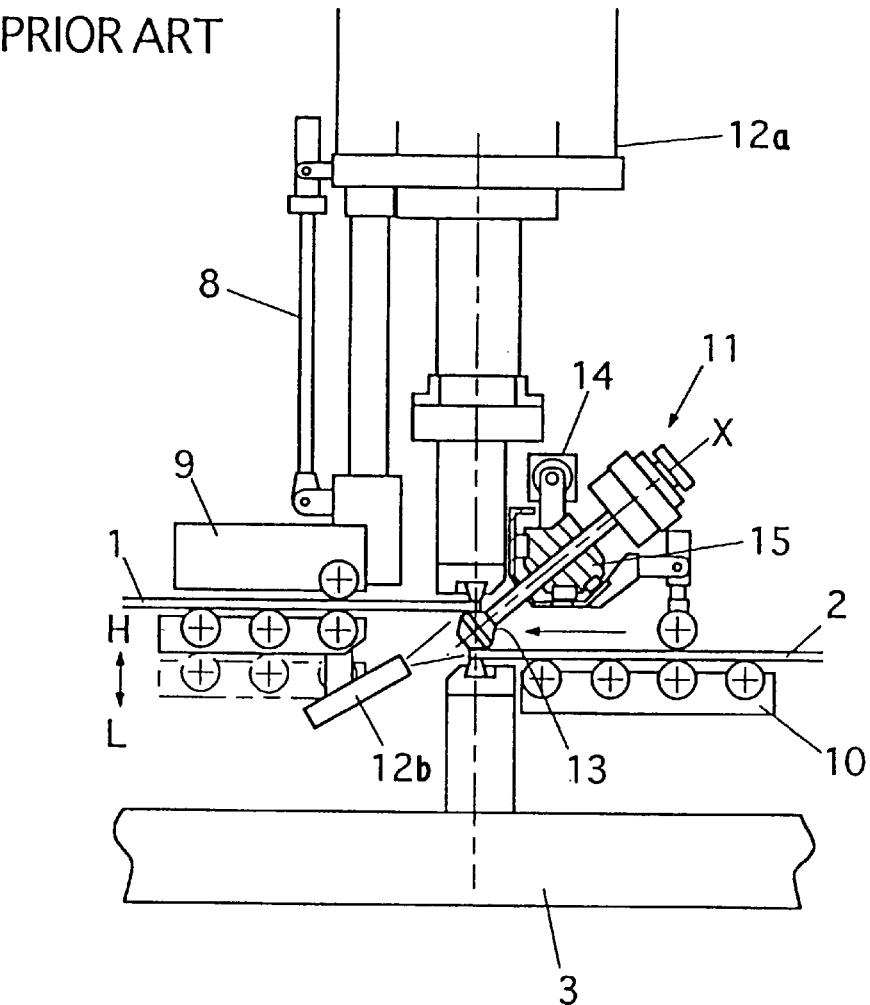
FIG. 2 is views showing a partial constitution of a conventional rolled plate joining apparatus.
Figure 2B:
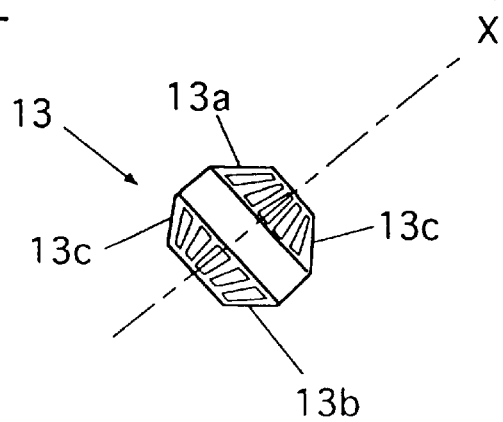
Figure 3:
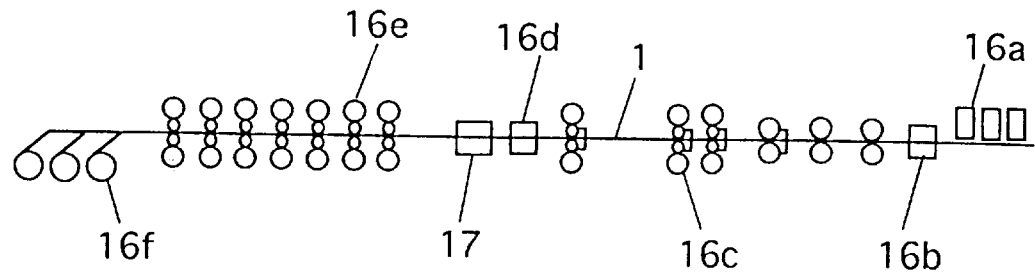
FIG. 3 is a view showing the constitution of a conventional hot rolling plant.
Figure 4:
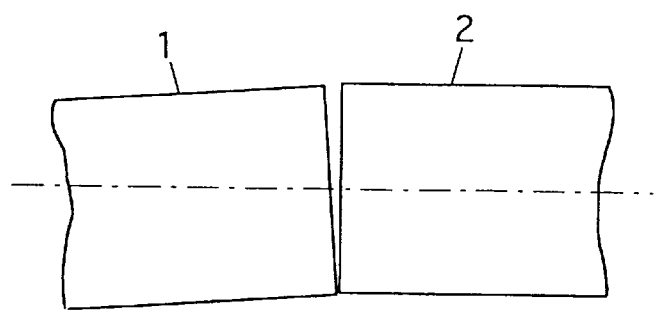
FIG. 4 is a view showing an example wherein the center lines of a preceding rolled plate and a succeeding rolled plate are not aligned with each other.
Figure 5:
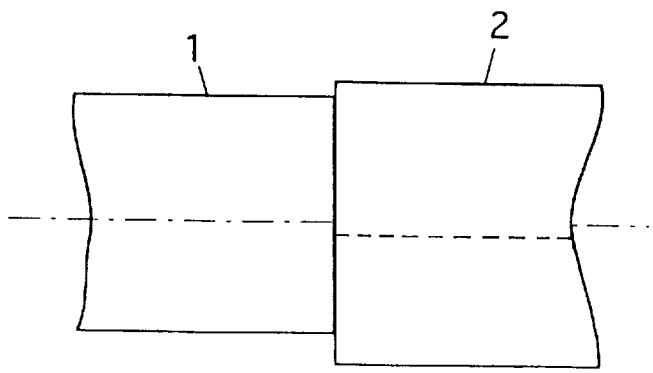
FIG. 5 is a view showing other example wherein the center lines of a preceding rolled plate and a succeeding rolled plate are not aligned with each other.
Figure 12:
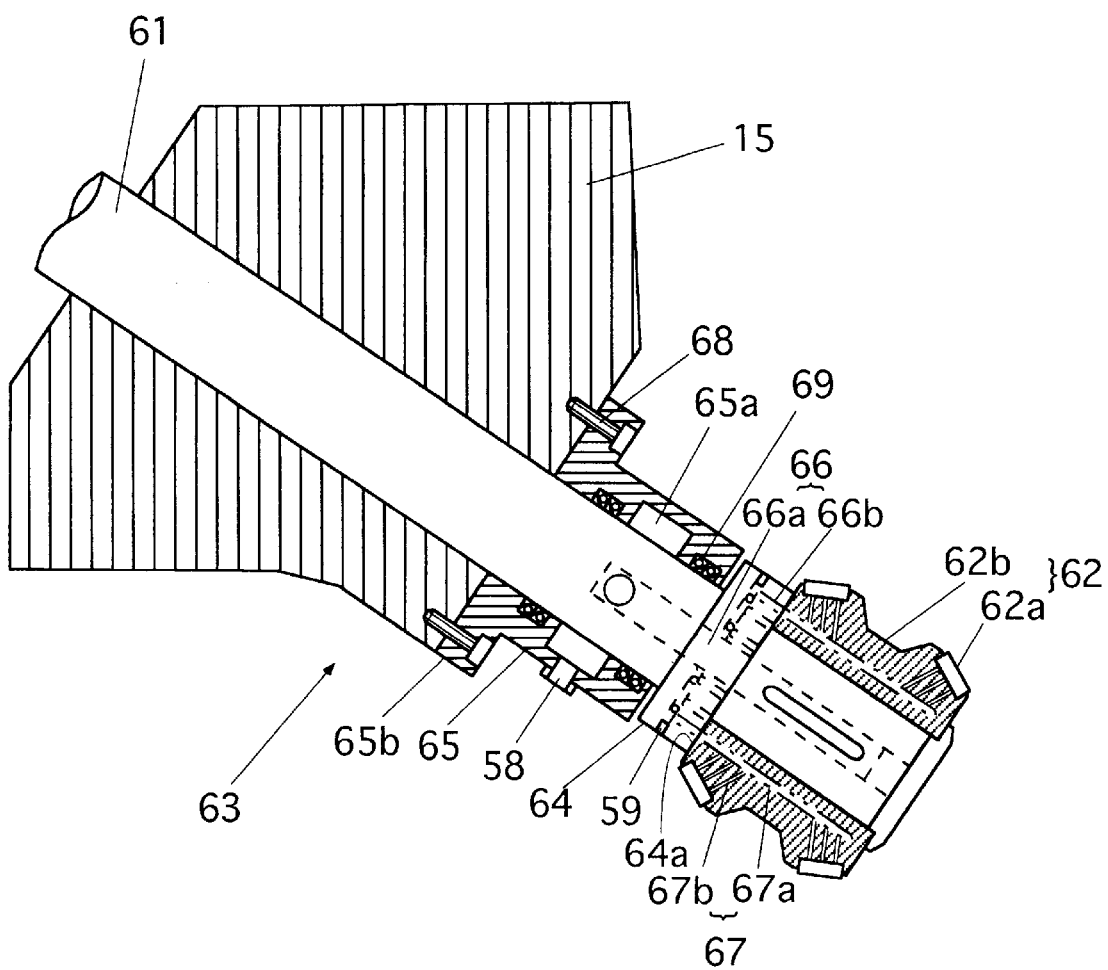
FIG. 12 is a side sectional view showing the cutter cooling apparatus of the rolled plate joining apparatus of the present invention.

FIG. 12 is a side section of the rolled plate joining apparatus of the present invention, showing a second embodiment. The rolled plate joining apparatus of the present invention shown in this figure is a rolled plate joining apparatus equipped with a cutter cooling apparatus having a cutting apparatus 63 for cutting a rolled plate by moving a conical cutter 62, which is put on the extremity of a slant shaft 61 and is rotated, horizontally in the direction of the width of the rolled plate (see FIG. 2). The conical cutter 62 has a plurality of cutter tips 62a on its truncated conical surfaces and is fixed with it abutted on a flange section 64 provided to the shaft 61 by putting from the extremity of the shaft 61. A supply ring 65 is fitted to form an annular space 65a behind a flange section 64 between it and the outer circumferential surface of the shaft 61. Further, the shaft 61 is provided with a supply passage 66 through the inside of the shaft 61 from the annular space 65a to communicate with a contact surface 64a of the flange section 64 in contact with the conical cutter 62. The conical cutter 62 is also provided with cooling passages 67 that are in communication with the supply passage 66 and extend to the cutter tips 62a. In this constitution, a coolant (a cooling non-oxidizing liquid or cooling inert gas) is supplied from the outside into the annular space 65a to cool the cutter tips 62a from the inside.

In passing, in this embodiment, a case wherein as a cooling inert gas, nitrogen gas is used is described.

The supply ring 65 has a flange section 65b at one end and is cylindrical and its inner circumferential surface has an annular groove. The annular space 65a is formed between this groove and the shaft 61. Bolts 68 are threaded into the flange section 65b to fix the supply ring 65 to a traversing table 15 of a traverse moving apparatus (see FIG. 2). High-pressure gas seals 69 are provided on opposite sides of the groove that forms the annular space 65a to keep the airtightness between it and the shaft 61. A nitrogen gas supply port 58 is provided to communicate with the annular space 65a.

The supply passage 66 is composed of a main supply passage 66a formed in the central part of the shaft 61 and distribution supply passages 66b formed in the flange 64 and is, for example, formed as follows. First the main supply passage 66a is drilled in the central part of the shaft 61 from the extremity (on the side of the conical cutter 62) to the position of the annular space 65a and further holes are radially formed to communicate with the annular space 65a. In passing the extremity of the main supply passage 66a is made airtight when it is in use. Then the distribution supply passages 66b are drilled radially from the flange section 64 to the main supply passage 66a and a plurality of circumferentially arranged holes are drilled axially from the side of the contact surface 64a in contact with the conical cutter 62 to communicate with them. By way of parenthesis, plugs 59 are put into ends of the radially drilled holes to make them airtight.

The foregoing cooling passages 67 are formed in a barrel section 62b of the conical cutter 62 so that they are completely in communication with the above-described distribution passages 66b. The cooling passages 67 are composed of main cooling passages 67a in communication with the distribution supply passages 66b and distribution cooling passages 67b distributed from the main cooling passages 67a to the cutter tips 62a. The main cooling passages 67a are formed by drilling axially a plurality of circumferentially arranged holes in the barrel 62b of the conical cutter 62 from the side of the contact surface in contact with the flange section 64. The distribution cooling passages 67b are formed to extend from the main cooling passages 67a to recesses in which the cutter tips 62a are attached. Additionally stated, although not shown in the figures, the joint section of the flange section 64 and the conical cutter 62 is provided with an O-ring to keep the seam between the supply passage 66 and the cooling passages 67 sealed.

In accordance with the cutter cooling apparatus of the rolled plate joining apparatus of the present invention, by supplying nitrogen gas to the nitrogen gas supply port 58 of the supply ring 65, the nitrogen gas can reach the inner surfaces of the cutter tips 62a (the surfaces on the side of the connection) via the supply passage 66 of the shaft 61 that is being rotated and the cooling passages 67 from the annular space 65a. The nitrogen gas reached the inner surfaces of the cutter tips 62a leaks out from their gaps to form streams of the nitrogen gas. Accordingly, fresh nitrogen gas can be supplied to the cutter tips 62a all the time and therefore the cooling can be carried out efficiently.

Figure 13:
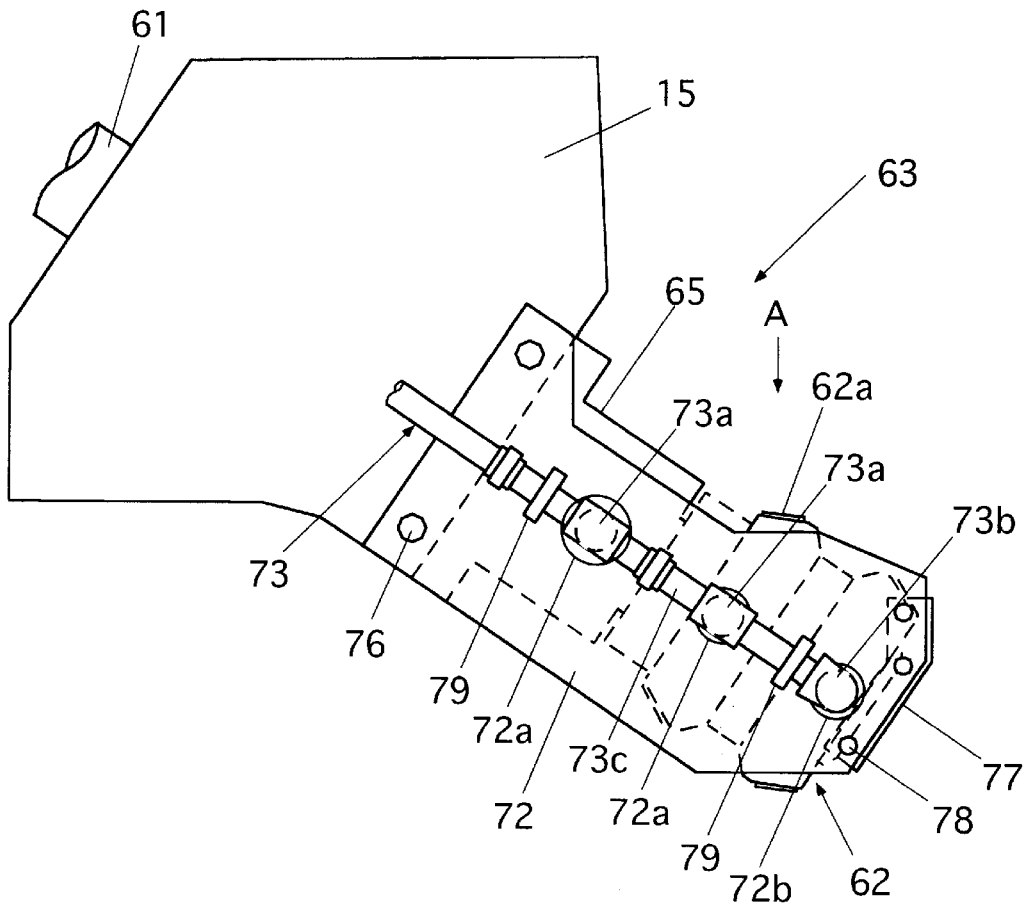
FIG. 13 is a side sectional view showing another embodiment of the cutter cooling apparatus of the rolled plate joining apparatus of the present invention.
Figure 14:
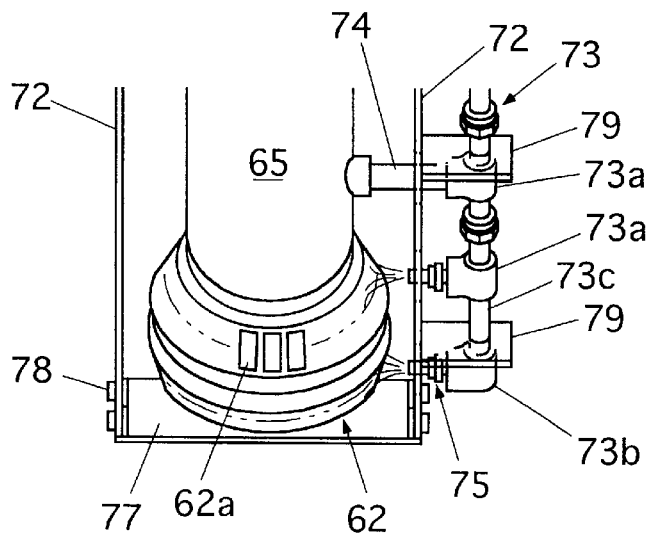
FIG. 14. is a view taken in the direction of the arrow A of FIG. 13.

FIGS. 13 and 14 are views showing other embodiment of the cutter cooling apparatus of the rolled plate joining apparatus of the present invention. FIG. 13 is a side view thereof and FIG. 14 is a view taken in the direction of the arrow A of FIG. 13. The rolled plate joining apparatus of the present invention shown in these figures is a rolled plate joining apparatus equipped with a cutting apparatus 63 for cutting a rolled plate by moving a conical cutter 62, which is put on the extremity of a slant shaft 61 and is rotated, horizontally in the direction of the width of the rolled plate (see FIG. 2). The conical cutter 62 has a plurality of cutter tips 62a on its truncated conical surfaces and is fixed with it abutted on a flange section 64 provided to the shaft 61 by putting from the extremity of the shaft 61. A supply ring 65 is fitted to form an annular space 65a behind the flange section 64 between it and the outer circumferential surface of the shaft 61. Further, the shaft 61 is provided with a supply passage 66 through the inside of the shaft 61 from the annular space 65a to communicate with a contact surface 64a of the flange section 64 in contact with the conical cutter 62. The conical cutter 62 is also provided with cooling passages 67 that are in communication with the supply passage 66 and extends to the cutter tips 62a. The above constitution is the same as that of the embodiment shown in FIG. 12.

In FIGS. 13 and 14, on the opposite sides of the shaft 61, there are provided covers 72 having opening sections 72a at positions corresponding to the positions of the supply ring 65 and the cutter tips 62a. Further, a cooling pipe 73 for supplying a coolant (a cooling non-oxidizing liquid or cooling inert gas) is supported on the outside of the cover 72 and a supply pipe 74 for supplying the coolant from the cooling pipe 73 into the annular space 62a is connected to the supply ring 65. Further, there are provided cooling nozzles 75 directed to the opening sections 72a from the cooling pipe 73. In this constitution, the coolant is brought in contact with the inner surfaces of the cutter tips 62a from the cooling passages 67 and also is jetted at the cutter tips 62a from the cooling nozzles 75, so that the cutter tips 62a are cooled from the outside and the inside. By way of parenthesis, the supply ring 65, the supply passage 66, and the cooling passages 67 are the same as those of the embodiment shown in FIG. 12 and therefore the description is omitted. In this embodiment, also, a case wherein as a cooling inert gas, nitrogen gas is used is described.

The covers 72 are provided on the opposite sides of the shaft 61 as is shown in FIG. 14 and one end is fixed to the traversing table 15 by bolts 76 and the other end is connected to a connecting member 77 and is fixed by bolts 78. A nipple 73c of the cooling pipe 73 is supported outside of the covers 72 by support members 79 and the cooling nozzles 75 are connected to the nipple 73c through T-shaped pipe joints 73a or an L-shaped pipe joint 73b. Further, in this embodiment, nitrogen gas is supplied from the cooling pipe 73 into the annular space 65a of the supply ring 65 through the T-shaped pipe joints 73a. Therefore, one supply source can be used for internal cooling and external cooling. If the internal cooling and the external cooling are carried out by using different coolants, separate supply sources may be provided. Parenthetically, the cooling pipe 73 may be supported by the cover 72 provided only on one side of the shaft 61.

According to the cutter cooling apparatus of the rolled plate joining apparatus of the present invention described above, internal cooling by supplying nitrogen gas from the cooling pipe 73 to the inner surfaces of the cutter tips 62a through the supply ring 65 (annular space 65a), the supply passage 66, and the cooling passages 67, and external cooling by jetting nitrogen gas supplied from the cooling pipe 73 onto the surfaces of the cutter tips 62a from the cooling nozzles 75 can be carried out simultaneously to cool the cutter tips 62a efficiently.

Although not shown, the cutter cooling apparatus of the rolled plate joining apparatus may be constructed in such that only external cooling is carried out by jetting nitrogen gas supplied from the cooling pipe 73 onto the surfaces of the cutter tips 62a from the cooling nozzles 75.

As is described above, according to the cutter cooling apparatus of the rolled plate joining apparatus of the present invention described above, the cutter (particularly cutter tips) can be cooled and the life thereof can be prolonged considerably. Further, although internal cooling only or external cooling only can be carried out for the cooling, by carrying out internal cooling and external cooling simultaneously, the cutter tips can be cooled efficiently.

Figure 15:
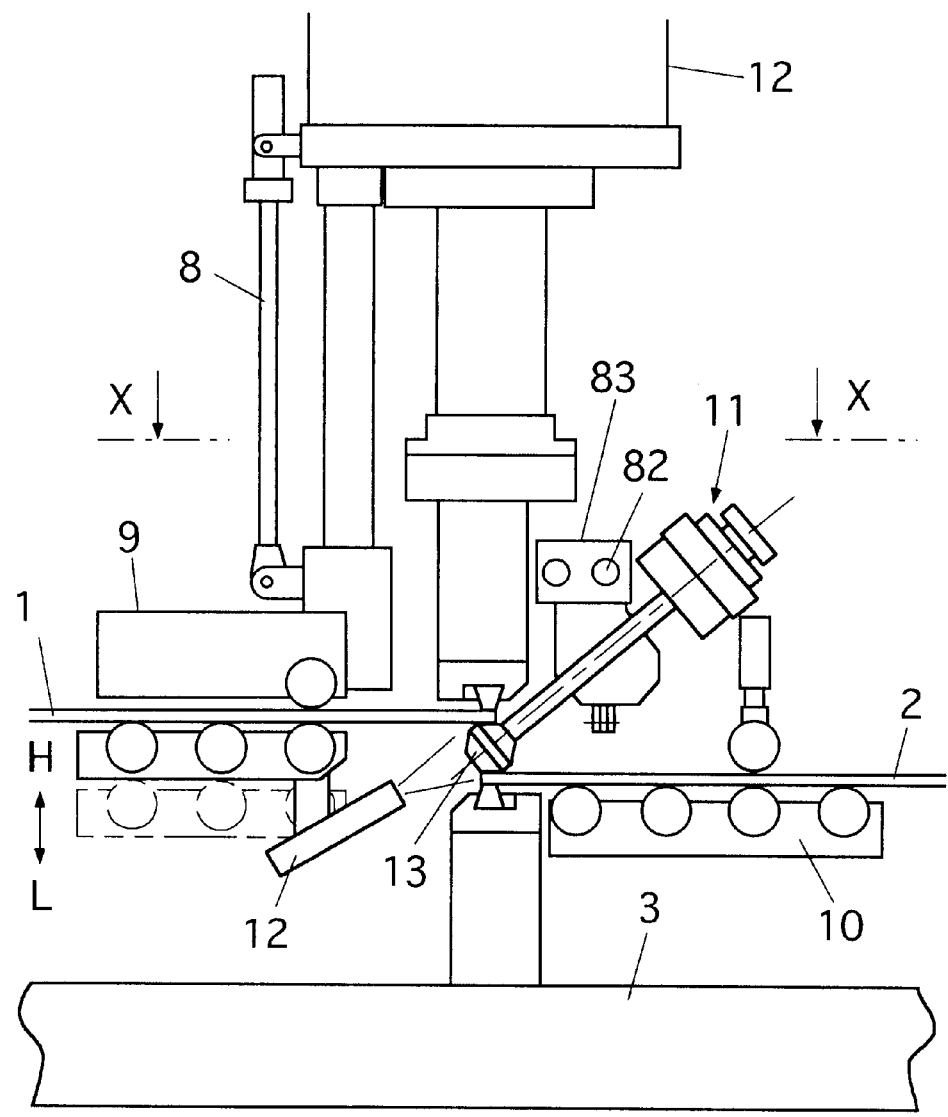
FIG. 15 is a view showing a partial constitution of the rolled plate joining apparatus according to the present invention.
Figure 16:
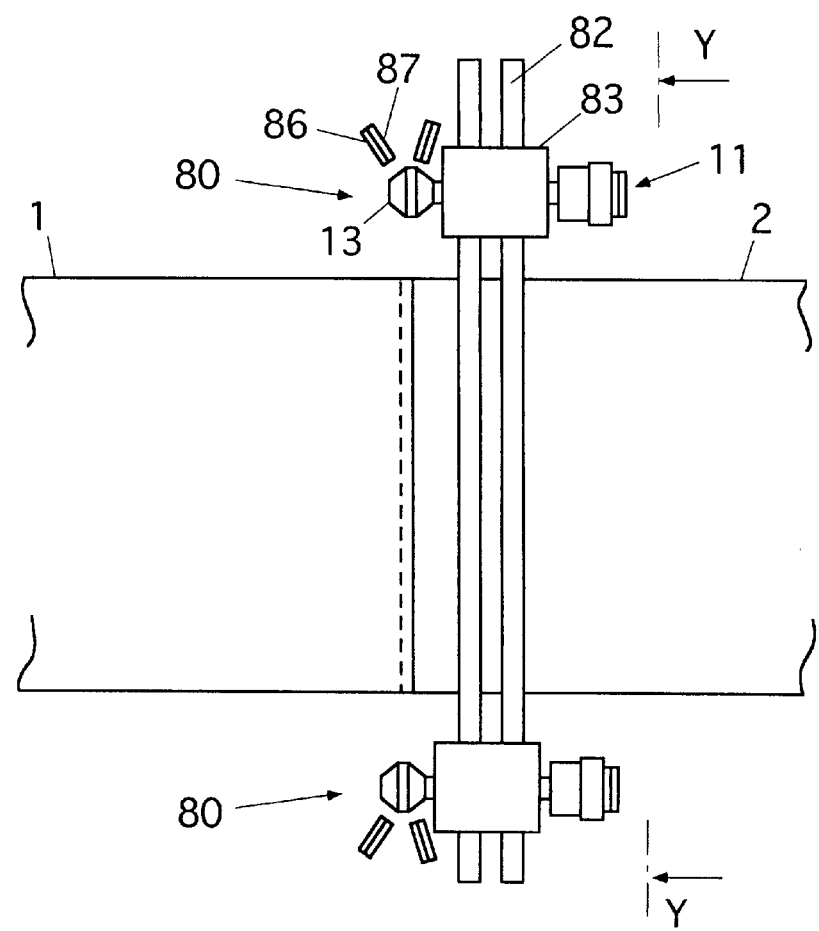
FIG. 16 is a view taken in the direction of the arrows X and X of FIG. 15.
Figure 17:
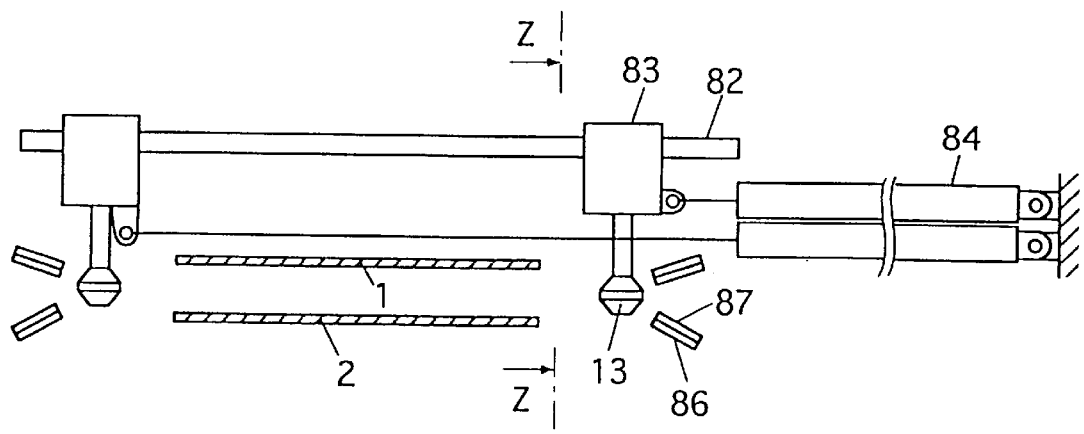
FIG. 17 is a view taken in the direction of the arrows Y and Y of FIG. 16.
Figure 18:
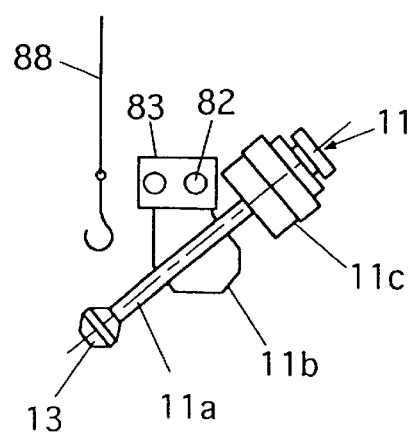
FIG. 18 is a view taken in the direction of the arrows Z and Z of FIG. 17.

FIG. 15 is a view of a partial constitution of a third embodiment of the rolled plate joining apparatus of the present invention, showing a cutting apparatus and apparatuses around it. FIG. 16 is a view taken in the direction of the arrows X and X of FIG. 15, showing the cutting apparatuses in the waiting positions, FIG. 17 is a view taken in the direction of the arrows Y and Y of FIG. 16, showing the traversing apparatuses, and FIG. 18 is a view taken in the direction of the arrows Z and Z of FIG. 17, showing the apparatuses for replacing the cutters.

The cutting apparatus 11 comprises a cutter 13, a cutter shaft 11a having the cutter 13 detachably to its extremity, a shaft support section 11b for rotatably supporting the cutter shaft 11a, and a shaft driving apparatus 11c for rotating the cutter shaft 11a. Waiting positions 80 wherein the cutting apparatuses 11 wait are provided on the opposite sides of the width of the plate. Two parallel guide rods 82 extending to the waiting positions 80 are provided and there are provided guide blocks 83 slidably fitted to the guide rods 82 and fixed to the shaft support sections 11b and a traversing cylinder 84 for traversing the guide block 83 along the guide rods 82.

Further, in the waiting positions 80, there are provided cooling agent nozzles 86 for discharging a cooling agent and abrasion preventive agent nozzles 87 for applying an abrasion preventive agent. The cooling agent nozzles 86 are connected to an air source or a liquid nitrogen tank (not shown) to blow air or vaporized low-temperature nitrogen to the cutters 84. The abrasion preventive agent nozzles 87 are connected to an abrasion preventive agent supply apparatus (not shown) to apply an abrasion preventive agent to the cutter tips 13c of the cutter 13. As the abrasion preventive agent, a paste comprising a lubricant, such as molybdenum disulfide (MoS2), graphite (C), and lead oxide (PbO), and a binder, such as water glass and starch, is applied. The cooling agent nozzle 86 and the abrasion preventive agent nozzle 87 for the cooling of and the application to the cutter tips are illustrated integrally, but they may be separately provided.

Further, in the waiting positions 80, there are provided replacing apparatuses 88 for replacing cutters over the positions where the cutters 13 wait. Each of the replacing apparatuses 88 has a crane for hoisting or lowering the cutter 13.

The operation of the cutting apparatus constructed as described above and apparatuses around it are now described.

The joining of the rolled plates 1, 2 is carried out with an approximately constant interval in the same lot and the joining time is within several tens of seconds (generally within 20 seconds). At the time of joining, the cutting apparatus 11 is traversed by the traversing cylinder 84 from one end of the plate width to the other end between the undersurface of the tailing end of the preceding rolled plate 1 and the upper surface of the leading end of the succeeding rolled plate 2 while the cutter 13 is rotated by the shaft driving apparatus 11c to perform cutting. Since the cut surfaces are covered with reducing flames from reduction keeping apparatuses 12 and the cutting generates heat, the temperature of the cutter 13 during the cutting becomes very high. After the completion of the cutting, it waits at the waiting position 80 for the next joining. If the cutter 13 is damaged during the cutting, the cutting apparatus 11 is moved immediately to the waiting position 80, and other cutting apparatus 11 waiting in other waiting position 80 is moved to the cutting position to resume the cutting.

In the waiting position 80, air or vaporized low-temperature nitrogen gas is discharged from the cooling agent nozzle 86 to cool the cutter 13. During the cooling, the cutter 13 is rotated quickly to be cooled uniformly. When the cutter 13 is cooled to a prescribed temperature, the cooling is stopped and an abrasion preventive agent, such as molybdenum disulfide, from the abrasion preventive agent nozzle 87 is applied to the cutter tips 13c. Further, in the case wherein the cutter tips 13c are damaged or abraded to the limit, the cutter is cooled and replaced with a new cutter 13 using the replacing apparatus 88.

In this embodiment, one of the cutting apparatuses 11 is provided in one of the waiting positions 80 on the opposite sides of the plate width and the other cutting apparatus 11 is provided in the other waiting position 80, but both the cutting apparatuses 11 may be provided in one of the waiting positions 80. Also, three such cutting apparatuses 11 may be provided with one of them placed in one of the waiting positions 80 and with two of them placed in the other waiting position 80. In this way, the present invention is not restricted to the embodiment and indeed can be modified in various ways without departing from the spirit and scope of the present invention.

As is described above, according to the present invention, the life of a cutter is prolonged since the cutting is carried out with the cutter cooled by providing cooling apparatuses for cooling cutters in waiting positions. Further, since an abrasion preventive agent can be applied to cutter tips in Baiting positions, the life of the cutter is prolonged. Further, since cutter replacing apparatuses are provided in waiting positions, the replacement of a cutter can be carried out easily. Also, since at least two machining apparatuses are provided in waiting positions, if one of cutters is damaged, it can be immediately replaced.

Figure 19:
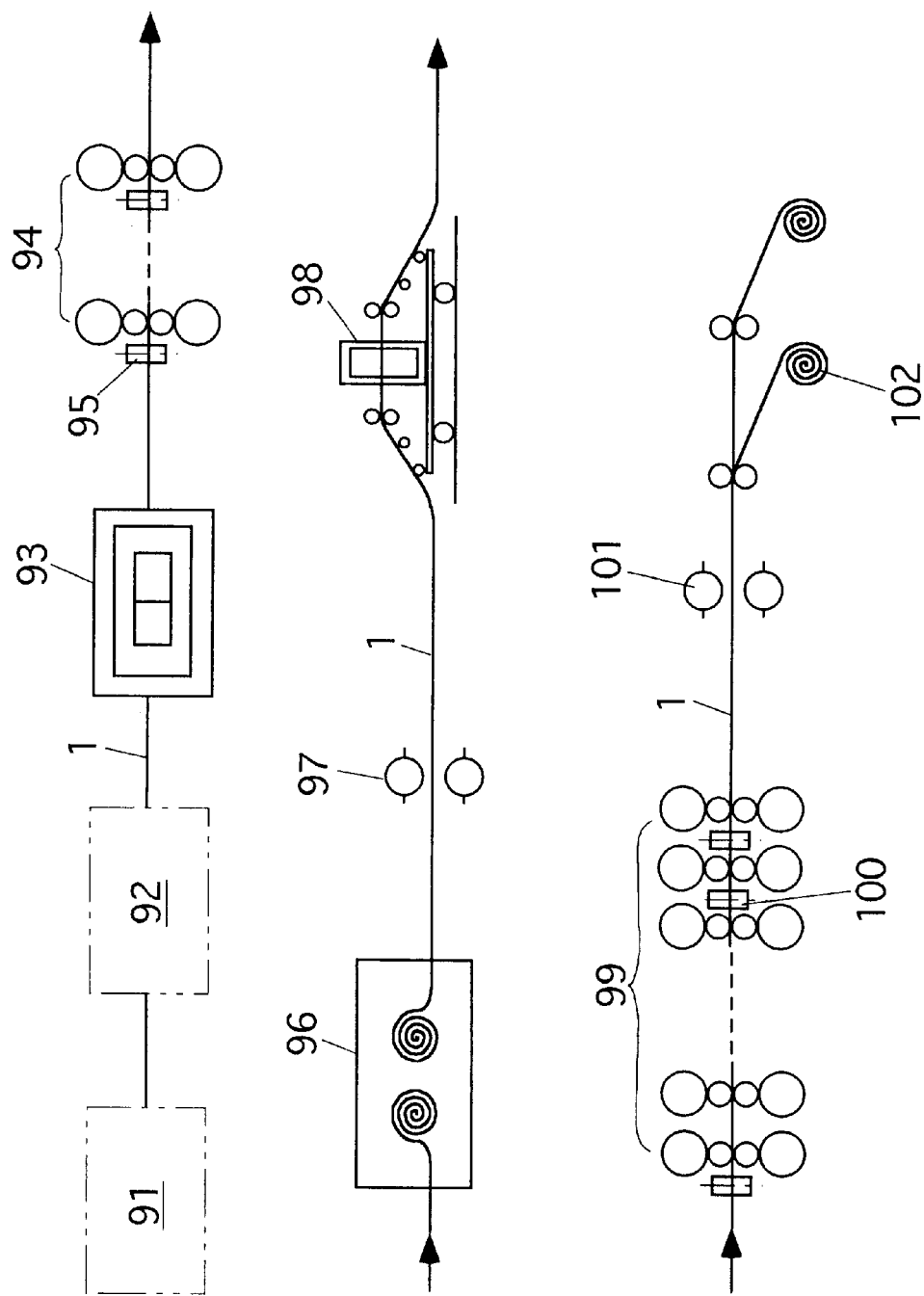
FIG. 19 is a side view showing the whole constitution of the continuous hot rolling apparatus according to the present invention.

FIG. 19 is a view showing a fourth embodiment of the present invention. In this figure, 91 indicates a continuous casting machine by which slabs chosen out of slabs having a thickness of about 250 mm and predetermined types of slab widths can be supplied. 92 indicates a heating furnace that heats slabs (rolled plates) to a temperature suitable for the succeeding rolling operation. 93 indicates a sizing press for pressing slabs with a press in the plate width direction and generally the pressing to about 300 mm is possible. When the sizing press 93 was not used, in the continuous cutting machine 91, it was required to supply slabs with the width defined inch by inch in accordance with the specification. For instance, the slab width had to be 600 mm, 620 mm, and 640 mm, but using the ability of the sizing press 13 of adjusting the width by 300 mm, since the width may be 600, 900, 1,200, and 1,500 mm, the types of molds of the continuous casting machine 91 required for widths can be reduced considerably and accordingly the mold replacing operation is reduced considerably to improve the productivity.

Roughing mills 94 roll roughly a slab 1 to a thickness suitable for allowing the resulting rolled plate to be wound by the below-described winding/unwinding machine 96 and suitable finish rolling, for example, to a thickness of about 30 mm. The number of the roughing mills will depend on the thickness of the slab 1 that will be supplied, and for example if the slab 1 has a thickness of about 250 mm, two reverse type roughing mills or 5 or 6 unidirectional roughing mills may be recommended, and if the thickness of the slab is increased, the number of the roughing mills is increased. Parenthetically, vertical type rolling mills 95 are provided on opposite sides of each of the roughing mills 94 to control the plate width.

The winding/unwinding machine 96 is an apparatus that takes up the rolled plate 1 that has been roughly rolled into a coil and unwinds that coil. The winding is carried out without a stem, and the coil is moved to an unwinding position and is unwound without a stem or with a stem that is also used for the movement. An unwinding machine that uses a stem can also be used. By winding in this way, the rough rolling line can be shortened. The formation of a coil requires less cooling and can keep a suitable finish rolling temperature. In passing, the winding g/unwinding machine 96 may be covered with an insulating material.

A crop shear 97 is an apparatus for cutting so that the tailing end of a preceding rolled plate to be joined and the leading end of a succeeding rolled plate to be joined may be joined suitably by the below-described reducing flame pressure welding type running joining machine 98. The reducing flame pressure welding type running joining machine 98 pressure-welds the tailing end of a rolled plate 1 unwound from the preceding coil to the leading end of the rolled plate 1 unwound from the succeeding coil while the reducing flame pressure welding type running joining machine 98 is run at the same speed as that of the rolled plate 1 and the surfaces to be joined are prevented from being oxidized by creating a reducing atmosphere around the surfaces to be joined.

Figure 6:
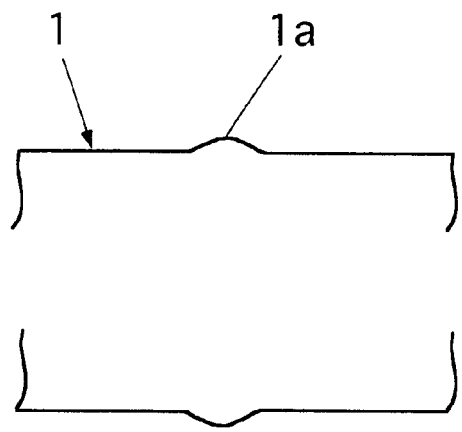
FIG. 6 is a view showing a bulge at joined parts.
Figure 7:
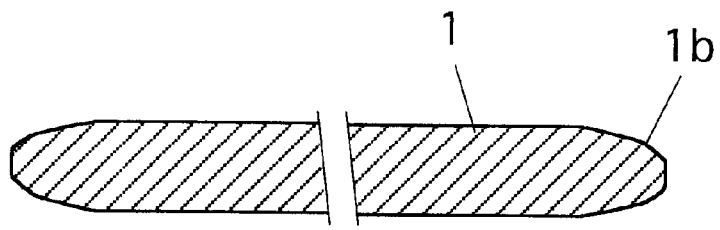
FIG. 7 is a view showing edge drops formed at width ends of a plate.

Finishing mills 99 carry out finish rolling of the joined rolled plates 1 to, for example, a strip generally having a minimum thickness of about 1.2 mm. The number of the finishing mills is about 6 to 7 and will be determined by the finally finished plate thickness. Edge forming machines 100 are provided on the entrance side of some of the finishing mills 99. Generally one edge forming machine is provided for the first finishing mill and one or two edge forming machines are provided for the last finishing mill. Each edge forming machine 100 comprises vertical type rolls that are provided on the opposite sides of the rolled plate 1 and forced down in the plate width direction to mold the rolled plate 1 to have a prescribed width to improve the plate width precision and the plate thickness precision. The edge forming machines 100 correct a bulge 1a shown in FIG. 6 to make the width equal to the other or decrease the width further to correct edge drops 1b shown in FIG. 7 to make the thickness uniform to the ends of the plate width and to cause the rolled plate to have a prescribed plate width. The edge forming machine 100 provided on the entrance side of the first finishing mill 99 adjusts the width of the rolled plate 1 entering the series of the finishing mills 99 and the edge forming machines 100 provided on the entrance side of the last one or two finishing mills 99 correct edge drops 1b produced by the finish rolling to obtain a prescribed plate thickness.

The rolled plate 1 rolled to the final plate thickness by the finishing mills 99 is wound by a winding machine 102 into a coil. When the coil has a prescribed diameter, the rolled plate 1 is cut by a cutter 101, which is operated at a high speed, to complete the winding. The succeeding rolled plate 1 after the cutting is wound by other winding machine 102 to resume the winding. The rolled plates 1 joined by the reducing flame pressure welding type running joining machine 98 are continuously processed by the finishing mills 99 and the winding machine 102 and thus the productivity and the yield are improved.

As is shown in FIG. 8, the reducing flame pressure welding type running joining machine 20 is equipped with a truck 22 that travels in the rolling direction, tailing end pinch rolls 24 that are mounted on the truck 22 and can be moved vertically with the tailing end of a preceding rolled plate 1 pinched horizontally, leading end pinch rolls 26 that are mounted on the truck 22 and can pinch horizontally the leading end of a succeeding rolled plate 2, machining apparatuses 28 for cutting the undersurface of the tailing end of the preceding rolled plate 1 and the upper surface of the leading end of the succeeding rolled plate 2, reducing flame burners 30a and 30b for keeping the surfaces to be machined in a reducing atmosphere, and a pressure welding apparatus 32 for joining the preceding rolled plate 1 and the succeeding rolled plate 2 with the machined surfaces of the preceding rolled plate 1 and the succeeding rolled plate 2 overlapped and reduced approximately to the thickness of the rolled plates 1 and 2.

Thus, while the preceding rolled plate 1 is held at the machining level H by the elevating cylinder 24a with the tailing end of the preceding rolled plate 1 supported horizontally by the tailing end pinch rolls 24, the undersurface of the tailing end of the preceding rolled plate 1 and the upper surface of the leading end of the succeeding rolled plate 2 can be cut by the cutter 19a, then the tailing end pinch rolls 24 are lowered to place the surfaces of the preceding rolled plate 1 and the succeeding rolled plate 2 to be machined one over the other with the tailing end of the preceding rolled plate 1 supported horizontally and they can be pressed and joined by the pressure welding apparatus 32. In passing, during the cutting and pressure-welding, the atmosphere surrounding the surfaces to be cut is made to be a reducing atmosphere by the reducing flame burners 30*a*, 30*b* to prevent the surfaces to be cut from being oxidized.

Figure 20:
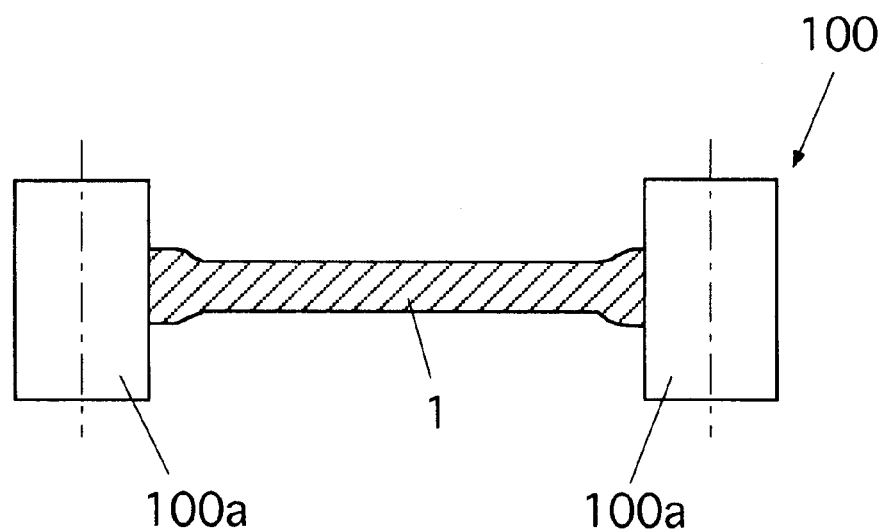
FIG. 20 is a view showing the constitution of an edge forming machine.

FIG. 20 is a view generally showing the edge forming machine 100. The rolled plate 1 is forced down in the plate width direction by the vertical type rolls 100*a* provided on the opposite sides of the rolled plate 1 to cause the rolled plate 1 to have a prescribed plate width. The vertical type rolls 100*a* can be moved in the plate width direction by an apparatus (not shown) to cause the plate width to be set to a prescribed distance.

In the above embodiment, although the slab supplied from the continuous casting machine 91 has a thickness of about 250 mm, the present invention may be applied to thicker slabs, for example, slabs having a thickness of about 110 mm. In that case, the number of roughing mills 94 is increased in conformity with the thickness of the slab.

As is apparent from the above description, in the present invention, since the hot rolling line includes a sizing press, a winding/unwinding machine, a joining machine, edge forming machines, and a cutting machine, the widths of slabs supplied by a continuous casting machine can be made intensive and therefore the productivity of the continuous casting machine and the productivity of the hot rolling plant are improved. Further, the continuous rolling of strips is made possible, and therefore the productivity and the yield are improved. Further, the plate width precision is improved by the edge forming machines before or between finishing mills and edge drops are made better.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A rolled plate joining apparatus, comprising:

a truck that can travel reversibly in a rolling direction;

tailing end pinch rolls that are mounted on said truck and can be moved vertically with the tailing end of a preceding rolled plate pinched horizontally;

leading end pinch rolls that are mounted on said truck and can pinch horizontally the leading end of a succeeding rolled plate;

a machining apparatus for cutting one surface of the tailing end of the preceding rolled plate and another surface of the leading end of the succeeding rolled plate;

a pressure welding apparatus for compressing the preceding rolled plate and the succeeding rolled plate with the machined surfaces overlapped to reduce them approximately to the thickness of the rolled plates;

a tailing end centering apparatus placed between said tailing end pinch rolls and said pressure welding apparatus for pressing opposite width ends of the tailing end of the rolled plate to align a center line of said preceding rolled plate with a center line of said joining apparatus in the rolling direction, wherein said tailing end centering apparatus further comprises an elevating apparatus and can carry out a centering operation for aligning the center line of the preceding rolled plate with the center line of the joining apparatus in the rolling direction, when the preceding plate is raised or lowered by said tailing end pinch rolls; and a leading end centering apparatus placed between said pressure welding apparatus and said leading end pinch rolls for pressing the opposite width ends to the leading end of the succeeding rolled plate to align a center line of said rolled plate with the center line of said joining apparatus in the rolling direction.

2. A rolled plate joining apparatus as claimed in claim 1, wherein each of said tailing end centering apparatus and said leading end centering apparatus comprises guide plates provided along opposite width ends of the rolled plates, a lower rack plate having a rack on the upper surface in the plate width direction and fixed to one of the guide plates, an upper rack plate having a rack on the undersurface in the plate width direction and fixed to another of the guide plates, a pinion arranged between said lower rack plate and said upper rack plate and meshed with said racks of said rack plates, and a rack plate driving apparatus for extending or retracting said lower rack plate and said upper rack plate in the plate width direction.

* * * * *